(12) United States Patent
Yan et al.

(10) Patent No.: US 12,151,384 B2
(45) Date of Patent: Nov. 26, 2024

(54) METHOD FOR BUILDING A LOCAL POINT CLOUD MAP AND VISION ROBOT

(71) Applicant: AMICRO SEMICONDUCTOR CO., LTD., Guangdong (CN)

(72) Inventors: Yongxian Yan, Guangdong (CN); Qinwei Lai, Guangdong (CN); Gangjun Xiao, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 0 days.

(21) Appl. No.: 17/785,403

(22) PCT Filed: Jun. 3, 2021

(86) PCT No.: PCT/CN2021/098145
§ 371 (c)(1),
(2) Date: Jun. 15, 2022

(87) PCT Pub. No.: WO2022/088680
PCT Pub. Date: May 5, 2022

(65) Prior Publication Data
US 2023/0249353 A1 Aug. 10, 2023

(30) Foreign Application Priority Data
Oct. 30, 2020 (CN) .......................... 202011192850.8

(51) Int. Cl.
*B25J 9/16* (2006.01)
*G01S 17/894* (2020.01)
(Continued)

(52) U.S. Cl.
CPC .......... *B25J 9/1697* (2013.01); *B25J 9/1666* (2013.01); *G01S 17/894* (2020.01); *G06T 5/40* (2013.01);
(Continued)

(58) Field of Classification Search
CPC ......... B25J 9/1697; B25J 9/1666; G06T 7/70; G06T 5/40; G06T 2207/10028; G01S 17/894; G06V 10/25; G06V 10/761
See application file for complete search history.

(56) References Cited

U.S. PATENT DOCUMENTS

2014/0003705 A1* 1/2014 Taguchi ................. G06T 7/344
382/154
2014/0350839 A1 11/2014 Pack et al.
(Continued)

FOREIGN PATENT DOCUMENTS

CN 104732518 A 6/2015
CN 106441306 A 2/2017
(Continued)

OTHER PUBLICATIONS

"Dense Visual Slam for RGB-D cameras". Christian Kerl (Year: 2013).*
(Continued)

*Primary Examiner* — Jaime Figueroa
*Assistant Examiner* — Mohamad O El Sayah
(74) *Attorney, Agent, or Firm* — Samson G. Yu

(57) ABSTRACT

The disclosure discloses a method for building a local point cloud map and a visual robot. According to the method for building the local point cloud map, point clouds which reflect a position of a large-range region around a robot are sampled according to a preset salient pose change condition; point clouds at different height positions are described in the form of a 3d histogram.

19 Claims, 1 Drawing Sheet

(51) Int. Cl.
*G06T 5/40* (2006.01)
*G06T 7/70* (2017.01)
*G06V 10/25* (2022.01)
*G06V 10/74* (2022.01)

(52) U.S. Cl.
CPC ............... *G06T 7/70* (2017.01); *G06V 10/25* (2022.01); *G06V 10/761* (2022.01); *G06T 2207/10028* (2013.01)

(56) References Cited

U.S. PATENT DOCUMENTS

| | | | |
|---|---|---|---|
| 2017/0153647 A1* | 6/2017 | Shin | G06T 7/13 |
| 2018/0149753 A1* | 5/2018 | Shin | G01S 7/4811 |
| 2019/0080190 A1* | 3/2019 | Shieh | G06V 20/46 |
| 2019/0086539 A1* | 3/2019 | Shin | G01S 7/4813 |
| 2019/0226852 A1* | 7/2019 | Xie | G01C 21/20 |
| 2020/0114509 A1* | 4/2020 | Lee | G01S 15/931 |
| 2020/0250807 A1* | 8/2020 | Hong | G06T 7/11 |
| 2021/0150734 A1* | 5/2021 | Shieh | G06T 7/73 |
| 2021/0223046 A1* | 7/2021 | Li | G05D 1/0274 |
| 2023/0177712 A1* | 6/2023 | Kang | G06T 7/13 382/154 |

FOREIGN PATENT DOCUMENTS

| | | |
|---|---|---|
| CN | 107160395 A | 9/2017 |
| CN | 110501017 A | 11/2019 |
| CN | 110689622 A | 1/2020 |
| CN | 112348893 A | 2/2021 |
| EP | 3367199 A1 | 8/2018 |
| EP | 3447532 A2 | 2/2019 |
| EP | 3447532 A3 | 4/2019 |
| JP | 2015515655 A | 5/2015 |

OTHER PUBLICATIONS

"Fast Visual Odometry using intensity-assisted iterative closest point", Shile Li (Year: 2016).*
Li Mantian et al: "Fast and robust mapping with low-cost Kinect V2 for photovoltaic panel cleaning robot", 2016 International Conference on Advanced Robotics and Mechatronics (ICARM), IEEE, Aug. 18, 2016(Aug. 18, 2016), pp. 95-100, XP032985651.
Jalobeanu Mihai et al: "Reliable kinect-based navigation in large indoor environments", 2015 IEEE International Conference on Robotics and Automation (ICRA), IEEE May 26, 2015(May 26, 2015), pp. 495-502, XP033168455.
The ESR of the family EP application issued on Jul. 20, 2023.

* cited by examiner

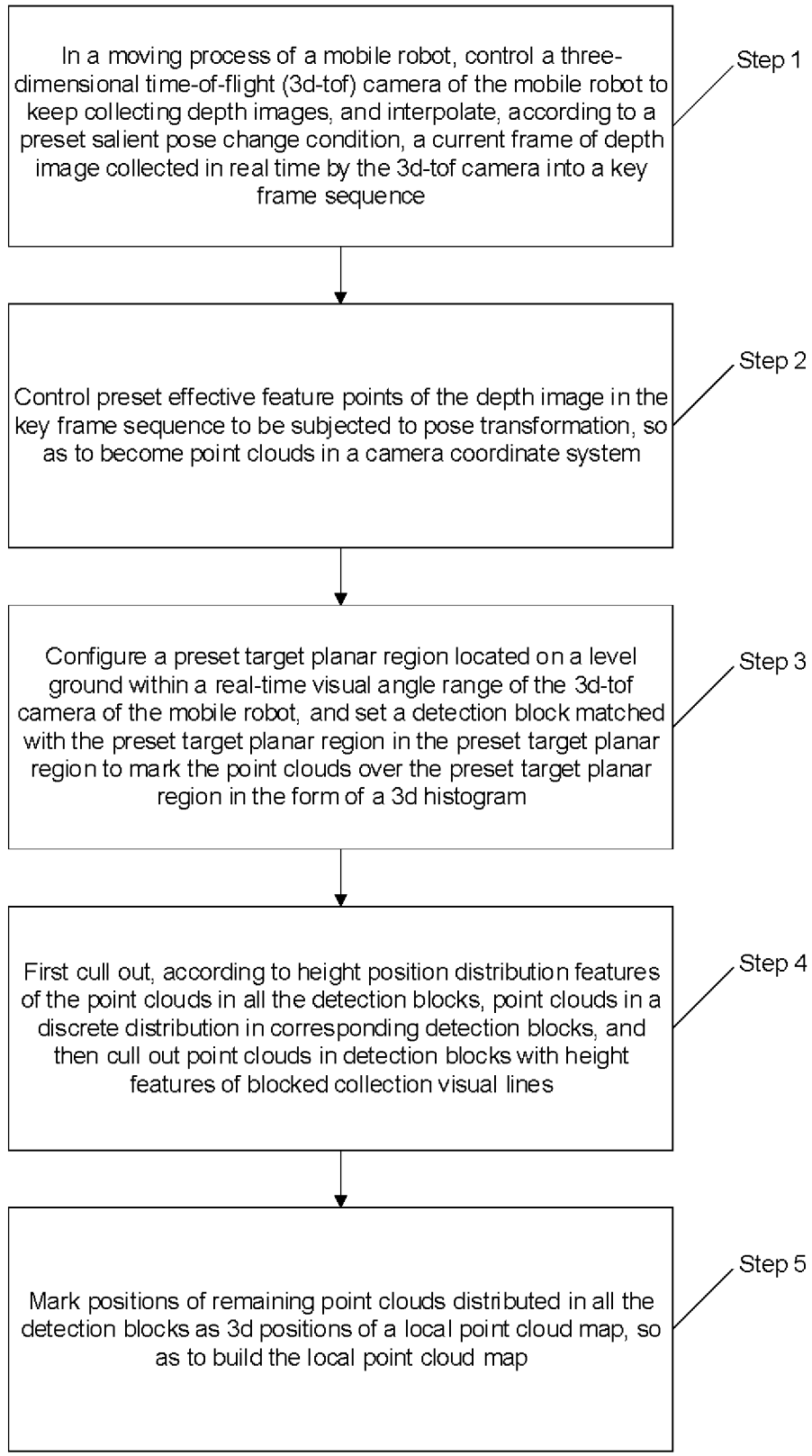

METHOD FOR BUILDING A LOCAL POINT CLOUD MAP AND VISION ROBOT

CROSS-REFERENCE TO RELATED APPLICATION

This application is a national application of PCT/CN2021/098145, filed on Mar. 6, 2021. The contents of PCT/CN2021/098145 are all hereby incorporated by reference.

TECHNICAL FIELD

The disclosure relates to the technical field of local point cloud maps, in particular to a method for building a local point cloud map based on point cloud data, and a vision robot.

BACKGROUND

A three-dimensional time-of-flight (3d-tof) technology can restore a 3d point cloud map within an effective range, but a 3d-tof camera has the following problems: Since a relatively accurate depth value cannot be obtained by 3d-tof, an error is usually too large. Specifically, when an obstacle is too close or too far, there will be an obvious error in a depth value, whereby an obstacle that is too close cannot be effectively recognized by single-frame-based depth data analysis. Therefore, a more accurate point cloud map is required to complete positioning of an obstacle.

According to a laser positioning initialization method disclosed in Chinese patent CN110031825A, multiple frames of laser point clouds which are continuously acquired are spliced to perform point cloud sampling to build a 3d coordinate system, and sampled point cloud information is stored in a real-time histogram. However, in this laser positioning initialization method, a mass of feature matrix operations need to be invoked, and a plurality of coordinate systems need to be built to establish a real-time 3d histogram; furthermore, a feature matching operation corresponding to point cloud data is too complex, which is not favorable for building an accurate and simple local point cloud map; and the problems in positioning and recognition of the above obstacle which is too close still cannot be solved.

SUMMARY

The disclosure discloses a method for building a local point cloud map. Specific technical solutions are as follows:

a method for building a local point cloud map. The method for building the local point cloud map includes: step 1, in a moving process of a mobile robot, a 3d-tof camera of the mobile robot is controlled to keep collecting depth images, and according to a preset salient pose change condition, a current frame of depth image collected in real time by the 3d-tof camera is interpolated into a key frame sequence; then step 2 is executed; step 2, preset effective feature points of the depth image in the key frame sequence is controlled to be subjected to pose transformation, so as to become point clouds in a camera coordinate system, and step 3 is executed; step 3, a preset target planar region is configured located on a level ground within a real-time visual angle range of the 3d-tof camera of the mobile robot, and detection blocks matched with the preset target planar region are set in the preset target planar region to mark the point clouds over the preset target planar region in the form of a 3d histogram, and step 4 is executed; step 4, first according to height position distribution features of the point clouds in all the detection blocks, point clouds in a discrete distribution in corresponding detection blocks are culled out, and then point clouds in detection blocks with height features of blocked collection visual lines are culled out; then step 5 is executed; and step 5, positions of remaining point clouds distributed in all the detection blocks are marked as 3d positions of a local point cloud map, so as to build the local point cloud map.

A vision robot includes a 3d-tof camera and a processing unit, wherein the processing unit is configured for implementing the method for building the local point cloud map; and the 3d-tof camera is assembled on a body of the vision robot, so that the visual angle of the 3d-tof camera covers a position in front of the vision robot.

BRIEF DESCRIPTION OF THE DRAWINGS

FIG. 1 is a flow chart of a method for building the local point cloud map disclosed in one embodiment of the disclosure.

DETAILED DESCRIPTION OF THE EMBODIMENTS

The technical solutions in the embodiments of the disclosure will be described in detail below in combination with the accompanying drawings in the embodiments of the disclosure.

An embodiment of the disclosure discloses a method for building a local point cloud map. As shown in FIG. 1, the method for building the local point cloud map includes:

step 1: in a moving process of a mobile robot, a 3d-tof camera of the mobile robot to is controlled keep collecting depth images, and according to a preset salient pose change condition, a current frame of depth image collected in real time by the 3d-tof camera is interpolated into a key frame sequence; and step 2 is executed.

It should be noted that there are mainly two walking rules for the mobile robot, including walking along the side and walking along a 弓-shape. The 弓-shaped walking is used for sweeping an open region. In the 弓-shaped walking process, the mobile robot will encounter different obstacles. If an up-close obstacle is detected before the mobile robot turns 90 degrees along a 弓-shaped path, the same obstacle cannot be detected in the process of turning 90 degrees. A relatively large angle of rotation is required to be selected for the planned 弓-shaped path according to an orientation of an obstacle, so that a floor mopping robot rotates towards a direction away from the obstacle to bypass the obstacle. The mobile robot can be a floor mopping robot, which is also referred to as an automatic cleaning machine, an intelligent vacuum cleaner, a robot vacuum cleaner, and the like. It is one kind of intelligent household appliances and can automatically complete 弓-shaped planned cleaning work in a room by virtue of certain artificial intelligence.

As one embodiment, in the step 1, the method for interpolating, according to a preset salient pose change condition, a current frame of depth image collected in real time by the 3d-tof camera into a key frame sequence specifically includes:

A relative pose between a preset effective feature point in a current frame of depth image currently collected by the 3d-tof camera of the mobile robot and the same preset effective feature point in each key frame (a key frame subjected to pose transformation) in the key frame sequence are respectively calculated, wherein the key frame sequence is a sequence of continuously arranged depth images which are pre-stored in the mobile robot and include the preset effective feature points, and is used for storing relative position information of the body and orientation information of the camera in each of the continuous depth image frames, including depth image information of an obstacle which has been recognized by traversing and is too close to the body or is fitted to the body, so that when it is impossible to recognize this type of obstacle subsequently, reference coordinate information of these associated depth images are used to assist in positioning; wherein the preset effective feature point is used for representing a distribution position feature of an obstacle in front of the mobile robot within a visual angle range of the 3d-tof camera, and the distribution position feature of the obstacle comprises presence of the obstacle and/or absence of the obstacle.

when all the calculated relative poses satisfy the preset salient pose change condition, the current frame of depth image currently collected by the 3d-tof camera to be a new key frame is configured, and the new key frame is interpolated into the key frame sequence to enable a key frame which participates in the foregoing relative pose calculation next time to reflect a latest relative position relationship of the mobile robot, wherein the step 1 is configured for determining a degree of the relative pose between the depth image currently collected by the 3d-tof camera of the mobile robot and each frame of depth image in the key frame sequence, so as to subsequently screen out a depth image in which the body has a large enough displacement salience degree or a depth image in which the body has a large enough rotation salience degree; when the deflection angle and relative distance included in the relative pose calculated in the step 1 are both determined to be large, which represents that the mobile robot has a large displacement or has an obvious change in a turning angle, the current frame of depth image currently collected by the 3d-tof camera is configured to be a new key frame, and the new key frame is interpolated into the key frame sequence to enable a key frame which participates in the foregoing relative pose calculation next time to reflect a latest relative position relationship of the mobile robot.

The fact that all the calculated relative poses satisfy the preset salient pose change condition is specifically as follows: the calculated relative poses include: a depth distance variation and a corresponding deflection angle variation between the preset effective feature point in the current frame of depth image currently collected by the 3d-tof camera of the mobile robot and the same preset effective feature point in each key frame in the key frame sequence after the pose transformation, representing a displacement variation (corresponding to the depth distance variation) of the mobile robot relative to the stationary preset effective feature point and an angle deflection (corresponding to the deflection angle variation) generated around the preset effective feature point; when all the depth distance variations are greater than a preset distance change threshold, and all the deflection angle variations are greater than a preset angle change threshold, the preset salient pose change condition is determined to be satisfied, representing that the mobile robot has a large displacement or has an obvious change in a turning angle (for example, the mobile robot turns 90 degrees in the 弓-shaped planned walking process). Compared with the prior art, this embodiment has the advantage that by means of determining whether a variation of a distance between actual points (each of which is considered to be stationary) corresponding to the preset effective feature points of two frames of depth images and the 3d-tof camera is large enough and determining a variation of a deflection angle of the actual points (each of which is considered to be stationary) corresponding to the preset effective feature points of the two frames of depth images relative to the 3d-tof camera is large enough, whether a displacement of the body is large enough or an angle of rotation of the body is large enough is represented, thus making a gap between a depth image configured as a new key frame and the current frame of depth image; clear and wide-area peripheral information of the robot can be provided; the depth images in the key frame sequence to which the current frame of depth image belongs cover a large enough visual range (such as an angle, seen from the left and seen from the right, or a displacement, seen closely and seen far, wherein the pose of the robot should be transformed greatly among these angle positions), so that both a key frame including an obstacle and a key frame excluding an obstacle exist in the depth images in the key frame sequence, and the subsequent processing of the information of the built local point cloud map is assisted to execute an accurate positioning function for an obstacle.

Preferably, the distance between the preset effective feature point in each key frame in the key frame sequence and the 3d-tof camera under the corresponding key frame is a depth distance from an actual position corresponding to the preset effective feature point of the depth image which is pre-collected by the 3d-tof camera and interpolated into the key frame sequence to an imaging plane of the 3d-tof camera, and a variation of the depth distance is used for representing a degree of a displacement of the mobile robot; the deflection angle of the preset effective feature point in each key frame in the key frame sequence relative to the 3d-tof camera under the corresponding key frame is a lens orientation angle when the 3d-tof collects the depth image that is interpolated into the key frame sequence, and a variation of the lens orientation angle is used for representing an angle of rotation of the mobile robot. Compared with the prior art, this embodiment extracts pose information of the preset effective feature point and participates in comparison operation of inter-frame offsets, which is convenient for screening out multiple key frames that represent large relative poses of the mobile robot; particularly after the body of the mobile robot rotates in a larger angle or has a larger displacement, if the 3d-tof camera cannot recognize a too close obstacle, a specific position of the too close obstacle is positioned by cooperation between pre-stored associated effective feature points (that is, pre-stored key frames that include obstacles) in the key frame sequence and the subsequent point cloud culling operation.

As another embodiment, in the step 1, the method step for interpolating, according to a preset salient pose change condition, a current frame of depth image collected in real time by the 3d-tof camera into a key frame sequence specifically includes:

step S101: a mobile robot is turned on to move in a current working region along a pre-planned 弓-shaped path; by the mobile robot in the moving process, a 3d-tof camera is used to collect depth images in a current working region, namely depth images including obstacles; and executing step S102;

step S102: when the 3d-tof camera of the mobile robot currently collects a current frame of depth image, an inertial sensor arranged inside the mobile robot to measure a current pose of the mobile robot is invoked and save the current pose, wherein it should be noted that if the depth images collected by the 3d-tof camera contains effective feature points in front of the body, including a non-overexposed point, a non-underexposed point, a non-too-far point, a non-too-close point, and a pixel point with a maximum vertical height of greater than 20 mm, this step can be executed; then step S103 is executed;

step S103: a pre-stored real-time mobile robot pose (an acquisition position) corresponding to each key frame in a key frame sequence is invoked, and a relative pose between the current pose of the mobile robot and the real-time mobile robot pose (a pre-stored acquisition position) corresponding to each key frame are respectively calculated; and then step S104 is executed. Preferably, the key frame sequence is a sequence of continuously arranged depth images which are pre-stored in the mobile robot and include the preset effective feature points, and is used for storing relative position information of the body and orientation information of the camera in each of the continuous depth image frames, including depth image information of an obstacle which has been recognized by traversing and is too close to the body or is fitted to the body, so that when it is impossible to recognize this type of obstacle subsequently, inertial information which is synchronously collected with these associated depth images is used to assist in positioning. wherein the preset effective feature point is used for representing a distribution position feature of an obstacle in front of the mobile robot within a visual angle range of the 3d-tof camera, and the distribution position feature of the obstacle comprises presence of the obstacle and/or absence of the obstacle.

The fact that all the calculated relative poses satisfy the preset salient pose change condition is specifically as follows: the calculated relative poses include: a walking distance variation of the mobile robot between the preset effective feature point in the current frame of depth image currently collected by the 3d-tof camera of the mobile robot and the same or same type of preset effective feature point in the pre-collected key frame, and a deflection angle variation generated in the same acquisition process; when all the walking distance variations are greater than a preset distance change threshold, and all the deflection angle variations are greater than a preset angle change threshold, the preset salient pose change condition is determined to be satisfied. It should be noted that the inertial sensor includes a coded disc arranged in a body center of the mobile robot and a gyroscope arranged inside the body center of the mobile robot; the coded disc is configured for measuring the walking distance variation of the mobile robot; the gyroscope is configured for measuring the deflection angle variation of the mobile robot in the same acquisition process; position coordinates of the mobile robot measured by the coded disc are converted, through a rigid connection relationship between the body center of the mobile robot and the 3d-tof camera, to the camera coordinate system to which the current frame of depth image correspondingly belongs, so as to build the local point cloud map, thus marking out a moving trajectory of the mobile robot during acquisition of the preset effective feature point on the local point cloud map. Since the pose change information of the mobile robot is directly obtained by using inertial data in this embodiment, the calculation for the relative pose is simplified relative to the calculation of the feature points of the foregoing embodiment.

Preferably, the feature points in each key frame in the key frame sequence about the same target obstacle is transformed to the same local point cloud map through pose transformation, so as to mark out the same target obstacle until poses of the mobile robot under different key frames are obtained.

step S104: whether all the calculated relative poses in the step S103 satisfy the preset salience pose change condition is determined, if YES, step S105 is executed, otherwise step S106 is executed. This step is used for determining a degree of a relative pose between a robot pose corresponding to the current frame of depth image and a robot pose corresponding to each frame of depth image in the key frame sequence, so as to subsequently screen out a depth image in which the body has a large enough displacement salience degree or has a large enough rotation salience degree.

step S105: when the deflection angle and relative distance included in the relative pose calculated in the step S103 are both determined to be large, which represents that the mobile robot has a large displacement or has an obvious change in a turning angle, the current frame of depth image currently collected by the 3d-tof camera is configured to be a new key frame, and the new key frame is interpolated into the key frame sequence to enable a key frame which participates in the foregoing relative pose calculation next time to reflect a latest relative position relationship of the mobile robot; step S201 is returned to continue to move and collect depth images in the current working region.

step S106: when the deflection angle and relative distance included in the relative pose calculated in the step S103 are both determined to be small, which represents that the mobile robot has a small displacement or has an unobvious change in a turning angle, the current frame of depth image currently collected by the 3d-tof camera is not configured to be a new frame, and the step S101 is returned to continue to move and collect depth images in the current working region.

In the foregoing steps, a fusion operation is performed on the inertial data acquired synchronously when the 3d-tof camera collects the current frame of depth image and the inertial data acquired synchronously when all the depth images in the key frame sequence are acquired, so as to obtain the relative pose that characterizes the position change of the mobile robot. The key frames that reflect clear and wide-area peripheral information of the robot are selected according to the preset salience pose change condition. Compared with the existing technology, the mobile robot can use these key frames to establish the local point cloud map which can cover the distribution of the obstacles in front of the mobile robot in a large range, so as to solve the following problem by performing fusion processing on relative poses of the current frame of depth image and these key frames that support update: it is difficult for the mobile robot to recognize, on the basis of a single frame of depth image collected in real time, an obstacle close to an edge position of the body or an obstacle which is too close to the body.

It should be noted that, in order to solve the problem that obstacles that are too close to the body cannot be detected after the mobile robot turns 90 degrees during 弓-shaped cleaning, in this embodiment, depth images in a pre-stored image sequence are used. If the current collection time is t, depth image frames collected at t−1, t−2 and t−3, or other early key frame images with temporality can be used, but it is not necessarily obstacles corresponding to edges of the depth images. In the key frames, those effective points that appear in front of the body can be used to be fused with the current frame to calculate the relative poses. At the same time, it is also necessary to acquire the position information collected in real time by the inertial sensor at the body center.

As an embodiment, when all the depth distance variations are greater than a preset distance change threshold, and all the deflection angle variations are greater than a preset angle change threshold, the preset salient pose change condition is determined to be satisfied, which represents that the mobile robot has a large displacement or has an obvious change in a turning angle (for example turning 90 degrees in the 弓-shaped planned walking process). Compared with the prior art, this technical solution has the advantage that by means of determining whether a variation of actual acquisition position points corresponding to two frames of depth images is large enough and determining whether a variation of actual body deflection angles corresponding to the two frames of depth images is large enough, whether a displacement of the body is large enough or an angle of rotation of the body is large enough is represented, thus making a gap between a depth image configured as a new key frame and the current frame of depth image; clear and wide-area peripheral information of the robot can be provided; the depth images in the key frame sequence to which the current frame of depth image belongs cover a large enough visual range (such as an angle, seen from the left and seen from the right, or a displacement, seen closely and seen far, wherein the pose of the robot should be transformed greatly among these angle positions), so that both a key frame including an obstacle and a key frame excluding an obstacle exist in the depth images in the key frame sequence; and the positioning calculation steps for an obstacle are simplified.

step 2: preset effective feature points of the depth image in the key frame sequence are controlled to be subjected to pose transformation, so as to become point clouds in a camera coordinate system, and step 3 is executed. A distance and a deflection angle between the preset effective feature point in each key frame in the key frame sequence and the 3d-tof camera under a corresponding key frame are both converted, in a translational rotation manner, to a camera coordinate system to which the current frame of depth image correspondingly belongs, so as to achieve the pose transformation; or, position coordinates of the mobile robot measured by the coded disc are converted, through a rigid connection relationship between the body center of the mobile robot and the 3d-tof camera, to the camera coordinate system to which the current frame of depth image correspondingly belongs, which also achieves the pose transformation. The coordinate system of the local point cloud map is a camera coordinate system corresponding to the current frame of depth image. Therefore, the preset effective feature points collected in each direction are transformed to the same local point cloud coordinate system (relative distance information and deflection angle information) to determine the relative pose of the mobile robot, and it is also convenient to determine whether there are obstacles in front of the mobile robot. At the same time, a moving trajectory of the mobile robot for collecting the preset effective feature points can also be marked. The same local point cloud coordinate system is the camera coordinate system corresponding to the current frame of depth image. This embodiment is favorable for restoring a more accurate local point cloud map and convenient for instant positioning navigation of the mobile robot. Preferably, the feature points in each key frame in the key frame sequence about the same target obstacle is transformed to the same local point cloud coordinate system through pose transformation, so as to mark out the same target obstacle until poses of the mobile robot under different key frames are obtained.

step 3, a preset target planar region is configured located on a level ground within a real-time visual angle range of the 3d-tof camera of the mobile robot, and detection blocks matched with the preset target planar region are set in the preset target planar region to mark the point clouds over the preset target planar region in the form of a 3d histogram, and step 4 is executed.

Specifically, the preset target planar region is a rectangular region; a middle point of one edge of the rectangular region is the position of the 3d-tof camera; a length of the edge is equal to a body diameter of the mobile robot; and the other edge perpendicular to the edge is disposed in front of the visual angle of the 3d-tof camera and is used for representing a detectable depth distance in a depth image collected by the 3d-tof camera. Thus, the preset target planar region is configured to be a target detection region that allows the mobile robot to successfully pass. In combination with the point clouds which are transformed from the poses of the key frames in the foregoing step 2 in the camera coordinate system, a maximum height position and distribution feature of obstacle point clouds above this region are positioned, so that an obstacle avoiding path for an obstacle under a near-distance condition is effectively planned.

Further, the method for marking each point cloud in the form of a 3d histogram includes: a coordinate origin of the 3d coordinate system to which the 3d histogram belongs is set to be the position of the 3d-tof camera; the preset target planar region covers a distance that is half of the body diameter in a forward direction of a horizontal axis of the 3d coordinate system is set; the preset target planar region covers a distance that is half of the body diameter in a negative direction of the horizontal axis of the 3d coordinate system is set; the preset target planar region covers the detectable depth distance in a forward direction of a longitudinal axis of the 3d coordinate system is set; the detection blocks are distributed along a vertical axis of the 3d coordinate system is set; a vertical height occupied by each detection block on the vertical axis of the 3d coordinate system is configured to represent a height of a point cloud distributed in the detection block; and the point clouds are divided to obtain the preset number of 3d histograms, so as to realize the point clouds in the form of a 3d histogram, wherein the 3d coordinate system to which the 3d histogram belongs is the same as a coordinate system of the local point cloud map. Therefore, the point clouds of the local map are converted into a 3d dot map in a specific detection region in a coordinate system of the local map, and the height of a bar distributed in the 3d dot map is used to characterize a point cloud height of an obstacle, so that it is convenient for significantly and quickly removing stray point clouds.

In this embodiment, a preset coordinate value range corresponding to the preset target planar region includes: by taking the center of the 3d-tof camera as a coordinate origin, a coordinate coverage range in a horizontal axis direction is: from the leftmost side −150 mm to the rightmost side +150 mm, and the coordinate range (expressed as a depth distance) in a longitudinal axis direction is: the nearest 0 mm to the farthest 300 mm. In this embodiment, the point cloud positions of the local map in each detection block with a horizontal projection area of 30 mm*30 mm are counted in a 3d histogram; those point clouds which are not within the coordinate value range of the preset target planar region are not segmented, and the maximum heights of the point clouds falling into this range are recorded; and a 3d dot map that marks the maximum height of the point clouds is generated in an effective target space region. Thus, the preset target planar region is configured to be a target detection region that allows the mobile robot to successfully pass. A maximum height position and distribution feature of obstacle point clouds above this region are recognized and positioned, so that an obstacle avoiding path for an obstacle under a near-distance condition is in real time and effectively planned.

Preferably, a ratio of an area of the preset target planar region to a horizontal projection area of each detection block is a preset integer, so that the entire preset target planar region is evenly divided and occupied by a preset integer number of detection blocks. N detection blocks are arranged in each row, and M detection blocks are arranged in each column. The direction of a row is a side direction perpendicular to a forward motion direction of the body; and the direction of a column is the forward motion direction of the body, which is equivalent to an optical axis direction of the 3d-tof camera in this embodiment. The preset integer is a product of N and M, so that the point cloud coverage rate of the detection blocks for the preset target planar region is increased.

step 4, according to height position distribution features of the point clouds in all the detection blocks, point clouds in a discrete distribution in corresponding detection blocks are first culled out, and then point clouds in the detection blocks with height features of blocked collection visual lines are culled out; then step 5 is executed. In the step 4, when a 3d coordinate position of one point cloud falls into one detection block, the one point cloud is determined to be distributed in the one detection block, and a height of the one point cloud is recorded, thus simplifying the method for storing and applying the position information of the point cloud. Further, the heights of the point clouds distributed in all the detection blocks are respectively recorded according to the situation that the point clouds fall into all the detection blocks, including the maximum height of the point clouds distributed in each detection block, and the point clouds with the maximum height in each detection block is used to identify the maximum height position of the detection block, so that the point clouds are marked over the preset target planar region in the form of a 3d histogram. The point clouds in the detection block with the height feature of the blocked collection visual line are the point clouds distributed in the shorter detection block, a collection visual line is blocked by a certain higher detection block. The shorter point clouds are located in front of the 3d-tof camera and are arranged behind a higher detection block along a direction away from the 3d-tof camera.

In the step 4, the method for culling out point clouds in a discrete distribution state in corresponding detection blocks specifically includes: whether the number of point clouds distributed in each detection block is less than a positioning number threshold is determined; and if YES, the point clouds distributed in the detection block are culled out, and then point clouds in the detection blocks with height features of blocked collection visual lines are culled out; otherwise, the point clouds in the detection blocks with the height features of the blocked collection visual lines are directly culled out, wherein the positioning number threshold is used for describing the discrete distribution state; and/or, determining whether no point clouds are distributed in neighborhoods of one detection block; and if YES, the point clouds distributed in the detection block are culled out, and then point clouds in the detection blocks with height features of blocked collection visual lines are culled out; otherwise, the point clouds in the detection blocks with the height features of the blocked collection visual lines are directly culled out.

Specifically: Due to external interference such as blockage to the visual line, obstacles, and other factors, there are often discrete points, which are far away from the point clouds of obstacles to be located and recognized, in point cloud data, that is, outliers which will affect the accuracy of positioning navigation of the point cloud map. In this embodiment, the step 4 specifically includes:

when it is determined that the number of point clouds distributed in the detection block is less than the positioning number threshold, the point clouds distributed in the detection block are culled out, specifically removing the point clouds distributed in the detection block, and the point clouds are culled out from the position over the preset target planar region;

or, when it is determined that the number of point clouds distributed in the detection block is less than the positioning number threshold, then continue to determine whether there are no point clouds distributed in neighborhoods of the detection block, and if YES, the point clouds distributed in the detection block are culled out;

or, when it is determined that there are no point clouds distributed in the neighborhoods of one detection block, indicate that the point clouds distributed in this detection block exist over the preset target planar region alone, and the point clouds distributed in this detection block are culled out, specifically, the point clouds distributed in the detection block are removed, and the point clouds are culled out from the position over the preset target planar region;

or, when it is determined that there are no point clouds distributed in the neighborhoods of one detection block, continue to determine whether the number of point clouds distributed in this detection block is less than the positioning number threshold, and if YES, the point clouds distributed in this detection block are culled out.

According to the foregoing steps, the noise interference caused by point clouds which are in over-discrete distribution to recognition and positioning of an obstacle is reduced, particularly, the problem of a positioning error caused by a too far obstacle is relieved, thus improving the accuracy of recognition of a too close obstacle.

In the step 4, the method for culling out point clouds in the detection blocks with height features of blocked collection visual lines includes:

step 41, a height of the point clouds distributed in each column of detection blocks is detected along a direction away from the 3d-tof camera; whether a detection block sequence changing from short to high exists among all the columns of detection blocks is respectively determined; if YES, step 42 is executed, or step 43 is executed, wherein the change from short to high corresponds to a change of height positions of the point clouds having the maximum heights and distributed in all the detection blocks that participate in the determination, and the maximum heights of the point clouds distributed in each detection block represents the actual height of each detection block, which reflects a stable height of each bar of the 3d histogram;

step 42, the detection block to which the point clouds with the maximum heights in the detection block sequence belongs is recorded, then the point clouds distributed in the relatively small detection blocks behind the recorded detection block are culled out, and return to step 41; continuing along an original detection and traversing direction, whether a detection block sequence changing from short to high exists among one corresponding column of the remaining detection blocks (which can include the detection blocks, the point clouds of which are culled out) is determined; if YES, the detection block sequence is higher than the highest point clouds of the detection block sequence determined at the last time is determined; continue to repeated the foregoing culling step, so as to cull out the point clouds distributed in all the detection blocks behind the detection block, to which the highest point clouds belong, in the corresponding column of detection blocks.

step 43, the detection block to which the point clouds with the maximum heights in the detection block sequence is recorded, and then the point clouds distributed in the detection blocks behind the recorded detection block are culled out.

In this embodiment, error points which are not favorable for current positioning in the point clouds after the coordinate system transformation need to be first filtered. In the step 4 of this embodiment, the point clouds stored in the form of a 3d histogram include many unreasonable points. For example, when the mobile robot faces a wall, the thickness of the point clouds is more than 10 cm, so that it can be determined, on the basis of the foregoing step, whether the detection block which is collected in front of the current position of the body and represents the height of wall point clouds can block the visual line; if YES, even if the point clouds in a detection block behind this detection block is effective (that is, the point clouds are pre-collected by the 3d-tof camera and marked on the local map), they should not be collected by the 3d-tof camera at the current position; therefore, the point clouds in all the detection blocks behind this detection block need to be culled out to avoid such a phenomenon that the corresponding pre-collected point clouds marked on the local map for positioning are directly used for positioning, without considering the influence of the actual height positions of the point clouds within the visual angle range of the 3d-tof camera at the current position. It is also understood that due to the interference factor in real-time positioning caused by an error of the point clouds, the position behind a too high obstacle cannot be seen at the current position. However, the 3d-tof camera has collected related depth images, and the mobile robot of this embodiment easily uses the point clouds in the detection blocks behind the highest detection block to position an obstacle, so that a positioning error is easy to generate. Therefore, the point clouds in all the shorter detection blocks behind this detection block, and the point clouds in the highest detection block to in real time position and recognize an actual obstacle in the front, thus overcoming the influence caused by a point cloud position measurement error.

Therefore, compared with the prior art, this embodiment has the advantages that on the basis of the foregoing steps 41 to 43, the method for culling out the point clouds distributed in the detection blocks is carried out on the basis of the point clouds with the maximum heights. Specifically, the point clouds which are not lifted to a peak height position are selected to be maintained according to a shape of a hill in an actual physical environment, and the relatively short point clouds (the point clouds in the detection blocks with height features of the blocked collection visual lines) corresponding to the back side of the hill are deleted, so that an obstacle which achieves a significant visual line blocking effect is maintained in the current position of the mobile robot; the point clouds which cannot be applied to obstacle positioning at the current position due to the blockage of the actual height position are deleted from the corresponding detection blocks on the preset target planar region, thus optimizing the filtering of the point cloud data of the local map. It is also understood that in order to overcome the positioning interference factor caused by a measurement error of the point clouds (in an actual scenario, the detection blocks behind a too high obstacle cannot be seen, and the depth images have been collected and transformed to the local map), the misjudgment phenomenon in a point cloud position of a too close obstacle is significantly reduced, and the accuracy of real-time positioning of the local map is improved.

step 5, positions of the remaining point clouds distributed in all the detection blocks are marked as 3d positions of a local point cloud map, so as to build the local point cloud map. In this embodiment, the key frame sequence includes three or more frames of depth images, so that more sufficient point cloud samples can be provided for building the local point cloud map and positioning, by means of the effective feature points, obstacles. During the execution of the step 5, partial point clouds that easily cause an error have been culled out from all the detection blocks, but positioning sample feature points involved in the depth images in the key frame sequence are sufficient, which can ensure that the local point cloud map is more stable and effective.

Preferably, a first-in first-out (FIFO queue) internal-memory storage form is used to cache the key frame sequence in the mobile robot, so that in the moving process, the mobile robot refreshes the latest interpolated key frame in the key frame sequence, and obtains the key frame which is closest in time to one frame of depth image currently collected in real time by the 3d-tof camera. In order to optimize a storage space, in this embodiment, a FIFO storage queue is used to store the latest screened and interpolated key frames to ensure that only the most effective frame sequences are stored, and the latest screened and interpolated key frames can be three frames of depth images closest to the current frame. The depth image data cached in the form of an FIFO queue is not redundant, which further maintains effective positioning information of the local point cloud map accurately.

To sum up, in the foregoing steps, the mobile robot uses these key frames to build a local point cloud map that can cover the distribution of obstacles in front of the mobile robot in a large range, so as to sample, according to the preset salient pose change condition, the point clouds that reflect positions in a large-range region around the robot by means of fusion processing of the relative poses between the current frame of depth image and these key frames that support update, so that the mobile robot can use these key frames to build a local point cloud map that can completely cover the distribution of obstacles in front of the mobile robot. Then, the point clouds at different heights are described in the form of a 3d histogram, which is convenient for removing stray points by using the 3d region distribution features of the point clouds in the different detection blocks; the following problem is solved: it is difficult for the robot to recognize, on the basis of a single frame of depth image collected in real time, an obstacle that is close to an edge position of the body or an obstacle that is too close to the body, thus improving the adaptability of the local point cloud map in scenarios with too close and too far obstacles and significantly reducing the difficulty in position recognition and positioning of a super-close obstacle and the probability of misjudgment.

In the foregoing embodiments, the preset effective feature points include non-overexposed points, non-underexposed points, non-too-far points, non-too-close points, and pixel points with a maximum vertical height of greater than 20 mm. A depth value of the non-too-far point and a depth value of the non-too-close point are both between 200 mm and 500 m, and are used for representing a set of effective position feature points of obstacles in front of the mobile robot within the visual angle range of the 3d-tof camera. Specifically, the non-overexposed point and non-underexposed point are obtained directly from the 3d-tof camera, and each pixel point in each frame of depth image has four states, including overexposed, underexposed, too far, and too close; the overexposed and underexposed points are both unreliable points; too close and too far points will not be stored in the queue (FIFO). Thus, untrusted pixel points in the depth images are excluded, including overexposed points and underexposed points that are greatly affected by light brightness, and too far and too close points that are greatly affected by distance errors. The stability of depth image positioning is improved. The preset effective feature points are feature points of effective markers in the forward motion direction of the mobile robot, and the 3d-tof camera collects different frames of depth images of the preset effective feature points from different directions in the moving process of the mobile robot, including successively collecting the preset effective feature points from the left, a direction close to a target, the right, and a direction away from the target in the turning process, so as to successively collect the depth images in which the visual line to the same marker is not blocked and the depth images in which the visual line to the same marker has been blocked; and when the mobile robot completes the method for building the local point cloud map, the point clouds with highest heights stored in the form of a 3d histogram are possibly environment position features representing that the collection visual line to this marker has been blocked.

A vision robot includes a 3d-tof camera and a processing unit, wherein the processing unit is configured for implementing the method for building the local point cloud map; and the 3d-tof camera is assembled on a body of the vision robot, so that the visual angle of the 3d-tof camera covers a position in front of the vision robot. Therefore, the 3d-tof camera samples the point clouds of a target obstacle in the moving process of the mobile robot; when the vision robot moves to a certain position, stray points are removed by using the height position distribution feature of the point clouds of the preset target planar region within the current visual angle range of the 3d-tof camera; only the reasonably distributed point clouds used for accurate positioning and having the maximum heights are allowed to be retained in the local map; and in a turning process, the vision robot can re-recognize an obstacle which has been recognized within the visual angle range and is close to an edge position of the body or an obstacle which is too close to the body, so that the positioning adaptability of scenarios in which obstacles are too close and too far is improved, and the probability of misjudgment on the position of a super-close obstacle is significantly reduced.

Obviously, the above-mentioned embodiments are merely examples taken for clear descriptions, but not intended to limit the implementations. Those of ordinary skill in the art can further make other changes or modifications in different forms on the basis of the above-mentioned descriptions. It is unnecessary and may not enumerate all implementation modes here. Obvious changes or modifications caused therefrom shall still fall within the protection scope of the disclosure.

What is claimed is:

1. A method for building a local point cloud map, wherein the method for building the local point cloud map comprises:

step 1, in a moving process of a mobile robot, controlling, by a processing unit, a three-dimensional time-of-flight (3d-tof) camera of the mobile robot to keep collecting depth images, and interpolating, by the processing unit, according to a preset salient pose change condition, a current frame of depth image collected in real time by the 3d-tof camera into a key frame sequence; then executing step 2, the robot comprises the 3d-tof camera and the processing unit, wherein, the preset salient pose change condition comprises: a displacement variation of the mobile robot relative to a preset effective feature point is greater than a preset distance change threshold, and an angle deflection of the mobile robot generated around the preset effective feature point is greater than a preset angle change threshold; or, a walking distance variation of the mobile robot is greater than a preset distance change threshold, and a deflection angle variation of the mobile robot generated in a same acquisition process is greater than a preset angle change threshold, wherein the walking distance variation is a variation the preset effective feature point in the current frame of depth image currently collected by the 3d-tof camera of the mobile robot and the same or same type of preset effective feature point in a pre-collected key frame, wherein the preset effective feature point is used for representing a distribution position feature of an obstacle in front of the mobile robot within a visual angle range of the 3d-tof camera, and the distribution position feature of the obstacle comprises presence of the obstacle and/or absence of the obstacle;

step 2, controlling, by the processing unit, the preset effective feature points of the depth image in the key frame sequence to be subjected to pose transformation, so as to become point clouds in a camera coordinate system, and executing step 3;

step 3, defining, by the processing unit, a preset target planar region located on a level ground within a real-time visual angle range of the 3d-tof camera of the mobile robot, and setting, by the processing unit, detection blocks matched with the preset target planar region in the preset target planar region to mark the point clouds over the preset target planar region in the form of a 3d histogram, and executing step 4;

step 4, first culling out, by the processing unit, according to height position distribution features of the point clouds in all the detection blocks, point clouds in a discrete distribution in corresponding detection blocks, and then culling out, by the processing unit, point clouds in detection blocks with height features of blocked collection visual lines; then executing step 5, wherein in the step 4, culling out the point clouds in the discrete distribution state in corresponding the detection blocks, comprises: determining whether the number of point clouds distributed in each detection block is less than a positioning number threshold; and if YES, culling out the point clouds distributed in the detection block, and then culling out point clouds in the detection blocks with height features of blocked collection visual lines; otherwise, directly culling out the point clouds in the detection blocks with the height features of the blocked collection visual lines, wherein the positioning number threshold is used for describing the discrete distribution state; and/or, determining whether no point clouds are distributed in neighborhoods of one detection block; and if YES, culling out the point clouds distributed in the one detection block, and then culling out point clouds in the detection blocks with height features of blocked collection visual lines; otherwise, directly culling out the point clouds in the detection blocks with the height features of the blocked collection visual lines, wherein, the point clouds in the detection block with the height feature of the blocked collection visual line are the point clouds distributed in the shorter detection block, a collection visual line is blocked by a certain higher detection block, the shorter point clouds are located in front of the 3d-tof camera and are arranged behind a higher detection block along a direction away from the 3d-tof camera; and step 5, marking, by the processing unit, positions of remaining point clouds distributed in all the detection blocks as 3d positions of a local point cloud map, so as to build the local point cloud map.

2. The method for building the local point cloud map according to claim 1, wherein interpolating, according to the preset salient pose change condition, the current frame of depth image collected in real time by the 3d-tof camera into the key frame sequence, comprises:

respectively calculating, by the processing unit, a relative pose between a preset effective feature point in a current frame of depth image currently collected by the 3d-tof camera of the mobile robot and the same preset effective feature point in each key frame in the key frame sequence, wherein the key frame sequence is a sequence of continuously arranged depth images which are pre-stored in the mobile robot and comprise the preset effective feature points;

when all the calculated relative poses satisfy the preset salient pose change condition, configuring, by the processing unit, the current frame of depth image currently collected by the 3d-tof camera to be a new key frame, and interpolating, by the processing unit, the new key frame into the key frame sequence to enable a key frame which participates in the foregoing relative pose calculation next time to reflect a latest relative position relationship of the mobile robot, wherein the preset effective feature point is used for representing a distribution position feature of an obstacle in front of the mobile robot within a visual angle range of the 3d-tof camera, and the distribution position feature of the obstacle comprises presence of the obstacle and/or absence of the obstacle.

3. The method for building the local point cloud map according to claim 2, wherein a distance and a deflection angle between the preset effective feature point in each key frame in the key frame sequence and the 3d-tof camera under a corresponding key frame are both converted, in a translational rotation manner, to a camera coordinate system to which the current frame of depth image correspondingly belongs, so as to achieve the pose transformation, by the processing unit;

wherein a coordinate system of the local point cloud map is the camera coordinate system corresponding to the current frame of depth image.

4. The method for building the local point cloud map according to claim 3, wherein all the calculated relative poses satisfy the preset salient pose change condition is specifically as follows:

the calculated relative poses comprise: a depth distance variation and a corresponding deflection angle variation between the preset effective feature point in the current frame of depth image currently collected by the 3d-tof camera of the mobile robot and the preset effective feature point in each key frame in the key frame sequence after the pose transformation;

when all the depth distance variations are greater than a preset distance change threshold, and all the deflection angle variations are greater than a preset angle change threshold, the preset salient pose change condition is determined to be satisfied by the processing unit.

5. The method for building the local point cloud map according to claim 4, wherein the distance between the preset effective feature point in each key frame in the key frame sequence and the 3d-tof camera under the corresponding key frame is a depth distance from an actual position corresponding to the preset effective feature point of the depth image which is pre-collected by the 3d-tof camera and interpolated into the key frame sequence to an imaging plane of the 3d-tof camera, and a variation of the depth distance is used for representing a degree of a displacement of the mobile robot;

the deflection angle of the preset effective feature point in each key frame in the key frame sequence relative to the 3d-tof camera under the corresponding key frame is a lens orientation angle when the 3d-tof collects the depth image that is interpolated into the key frame sequence, and a variation of the lens orientation angle is used for representing an angle of rotation of the mobile robot.

6. The method for building the local point cloud map according to claim 1, wherein the step 1 comprises:

when the 3d-tof camera of the mobile robot currently collects the current frame of depth image, invoking, by the processing unit, an inertial sensor configured inside the mobile robot to measure a current pose of the mobile robot; and then invoking, by the processing unit, a pre-stored real-time mobile robot pose corresponding to each key frame in the key frame sequence, and respectively calculating, by the processing unit, a relative pose between the current pose of the mobile robot and the real-time mobile robot pose corresponding to each key frame.

7. The method for building the local point cloud map according to claim 6, wherein all the calculated relative poses satisfy the preset salient pose change condition is specifically as follows:

the calculated relative poses comprise: a walking distance variation of the mobile robot generated between the preset effective feature point in the current frame of depth image currently collected by the 3d-tof camera of the mobile robot and the same or same type of preset effective feature point in the pre-collected key frame, and a deflection angle variation generated in the same acquisition process;

when all the walking distance variations are greater than a preset distance change threshold, and all the deflection angle variations are greater than a preset angle change threshold, the preset salient pose change condition is determined to be satisfied by the processing unit.

8. The method for building the local point cloud map according to claim 7, wherein the inertial sensor comprises a coded disc arranged in a body center of the mobile robot and a gyroscope arranged inside the body center of the mobile robot; the coded disc is configured for measuring the walking distance variation of the mobile robot; the gyroscope is configured for measuring the deflection angle variation of the mobile robot in the same acquisition process;

position coordinates of the mobile robot measured by the coded disc are converted, through a rigid connection relationship between the body center of the mobile robot and the 3d-tof camera, to the camera coordinate system to which the current frame of depth image correspondingly belongs, so as to build the local point cloud map by the processing unit.

9. The method for building the local point cloud map according to claim 8, wherein the key frame sequence comprises three or more frames of depth images.

10. The method for building the local point cloud map according to claim 9, wherein a first-in first-out internal-memory storage form is used to cache the key frame sequence in the mobile robot, so that in a moving process, the mobile robot obtains the key frame which is closest in time to one frame of depth image currently collected in real time by the 3d-tof camera.

11. The method for building the local point cloud map according to claim 1, wherein the preset target planar region is a rectangular region; a middle point of one edge of the rectangular region is the position of the 3d-tof camera; a length of the edge is equal to a body diameter of the mobile robot; and the other edge perpendicular to the edge is disposed in front of the visual angle of the 3d-tof camera and is used for representing a detectable depth distance in a depth image collected by the 3d-tof camera.

12. The method for building the local point cloud map according to claim 11, wherein in the step 4, when a 3d coordinate position of one point cloud falls into one detection block, by the processing unit, the one point cloud is determined to be distributed in the one detection block, and a height of the one point cloud is recorded.

13. The method for building the local point cloud map according to claim 11, wherein marking each point cloud in the form of the 3d histogram, comprises: setting, by the processing unit, a coordinate origin of the 3d coordinate system to be the 3d histogram belongs is the position of the 3d-tof camera; setting, by the processing unit, the preset target planar region covers a distance that is half of the body diameter in a forward direction of a horizontal axis of the 3d coordinate system; setting, by the processing unit, the preset target planar region covers a distance that is half of the body diameter in a negative direction of the horizontal axis of the 3d coordinate system; setting, by the processing unit, the preset target planar region covers the detectable depth distance in a forward direction of a longitudinal axis of the 3d coordinate system; setting, by the processing unit, the detection blocks are distributed along a vertical axis of the 3d coordinate system; configuring, by the processing unit, a vertical height occupied by each detection block on the vertical axis of the 3d coordinate system to represent a height of a point cloud distributed in the detection block, and dividing, by the processing unit, the point clouds to obtain the 3d histogram meeting a preset number, so as to realize the point clouds in the form of the 3d histogram;

wherein the 3d coordinate system to which the 3d histogram belongs is the same as a coordinate system of the local point cloud map.

14. The method for building the local point cloud map according to claim 13, wherein a ratio of an area of the preset target planar region to a horizontal projection area of each detection block is a preset integer, so that the entire preset target planar region is evenly divided by the preset integer number of the detection blocks and occupied by the detection blocks of the preset integer number.

15. The method for building the local point cloud map according to claim 13, wherein in the step 4, culling out the point clouds in the detection blocks with the height features of the blocked collection visual lines, comprises:

step 41, detecting, by the processing unit, a height of the point clouds distributed in each column of detection blocks along a direction away from the 3d-tof camera; respectively determining, by the processing unit, whether a detection block sequence changing from short to high exists among all the columns of detection blocks; if YES, executing step 42, or executing step 43, wherein the change from short to high corresponds to a change of height positions of the point clouds having the maximum heights and distributed in all the detection blocks that participate in the determination, and the maximum heights of the point clouds distributed in each detection block represents the height of each detection block;

step 42, recording, by the processing unit, the detection block to which the point clouds with the maximum heights in the detection block sequence, then culling out, by the processing unit, point clouds distributed in relatively short detection blocks behind the recorded detection block, and returning to step 41; and step 43, recording, by the processing unit, the detection block to which the point clouds with the maximum heights in the detection block sequence, and then culling out, by the processing unit, point clouds distributed in detection blocks behind the recorded detection block.

16. The method for building the local point cloud map according to claim 15, wherein the preset effective feature points on the key frames in the key frame sequence comprise a non-overexposed point, a non-underexposed point, a non-too-far point, a non-too-close point, and a pixel point with a maximum vertical height of greater than 20 mm, wherein a depth value of the non-too-far point and a depth value of the non-too-close point are both between 200 mm and 500 mm, wherein, a depth value of the non-too-far point and a depth value of the non-too-close point are both between 200 mm and 500 m, and are used for representing a set of effective position feature points of obstacles in front of the mobile robot within the visual angle range of the 3d-tof camera.

17. The method for building the local point cloud map according to claim 15, wherein the preset effective feature point is a feature point used for representing an obstacle or used for representing a standard road sign beyond the obstacle;

wherein the 3d-tof camera collects different frames of depth images of the preset effective feature point from different directions in the moving process of the mobile robot.

18. The method for building the local point cloud map according to claim 13, wherein determining whether no the point clouds are distributed in the neighborhoods of the one detection block, comprises: determining, by the processing unit, whether no the point clouds are distributed in eight neighborhoods of one detection block; and if YES, the point clouds distributed in the one detection block are culled out by the processing unit.

19. A vision robot, comprising a 3d-tof camera and a processing unit, wherein the processing unit is configured for implementing the method for building the local point cloud map according to claim 1;

the 3d-tof camera is assembled on a body of the vision robot, so that the visual angle of the 3d-tof camera covers a position in front of the vision robot.

* * * * *